United States Patent [19]

McFarlane et al.

[11] Patent Number: 4,488,277
[45] Date of Patent: Dec. 11, 1984

[54] CONTROL SYSTEM FOR AN OPTICAL DATA RECORDING APPARATUS

[75] Inventors: Robert McFarlane, New Rochelle; George C. Kenney, II, Ossining, both of N.Y.

[73] Assignee: North American Philips Corporation, New York, N.Y.

[21] Appl. No.: 347,608

[22] Filed: Feb. 10, 1982

[51] Int. Cl.³ .......................... G11B 7/00; G11B 27/36
[52] U.S. Cl. ........................................ 369/48; 369/54; 369/58; 369/106; 369/111; 369/116; 369/124
[58] Field of Search ................ 369/54, 116, 106, 111, 369/124, 122, 48, 58, 59, 60; 346/76 L; 365/200

[56] References Cited

U.S. PATENT DOCUMENTS

| | | | |
|---|---|---|---|
| 3,654,624 | 4/1972 | Becker | 346/76 L |
| 4,051,329 | 9/1977 | Blondet | 369/116 |
| 4,074,282 | 2/1978 | Balas | 346/76 L |
| 4,114,180 | 9/1978 | Kayanuma | 369/116 |
| 4,221,960 | 9/1980 | Maeda | 369/116 |
| 4,225,873 | 9/1980 | Winslow | 369/54 |
| 4,283,785 | 8/1981 | Miyouchi | 369/116 |
| 4,308,612 | 12/1981 | Miyauchi | 369/48 |
| 4,380,015 | 4/1983 | Ito | 369/116 |

OTHER PUBLICATIONS

"Ten Billion Bits on a Disk" by Bulthuis, IEEE Spectrum, Aug., 1979, pp. 26-33.

Primary Examiner—Alan Faber
Attorney, Agent, or Firm—Robert T. Mayer; Algy Tamoshunas

[57] ABSTRACT

A closed loop control system for an optical recording apparatus of the read after write type comprises a comparator for comparing the input data signal with a playback signal derived from the read beam which trails the write beam and is modulated by the data pattern inscribed on the recording medium by the write beam. The error signal generated by the comparator is applied to a controller which varies the modulation of the read beam in dependence on the error signal, for example, by modifying the data signal used to drive the write beam modulator. In this way, the control system compensates for nonuniformities in the recording medium and the like so as to ensure that the pattern inscribed by the write beam accurately represents the data to be stored.

16 Claims, 6 Drawing Figures

CONTROL SYSTEM FOR AN OPTICAL DATA RECORDING APPARATUS

The government has rights in this invention pursuant to Contract No. MDA904-77-C-0124 awarded by the Department of Defense.

BACKGROUND OF THE INVENTION

The invention relates to an apparatus for optically recording information on a recording medium with a beam of radiation and, in particular, to an apparatus wherein the medium undergoes an optically detectable change upon exposure to the beam so that the information can be read immediately after it is recorded.

In known optical recorders, the information is recorded by a laser beam on a recording medium, which typically is a rotating disc provided with a radiation sensitive layer. The intensity of the laser beam is modulated in accordance with the information to be recorded so that the beam forms, on the rotating disc, a series of micron-sized, spaced apart data spots which differ optically from the surrounding medium. Although various types of data registry layers have been proposed, the one most commonly used is a thin, reflective metallic film in which the data spots are pits melted by the laser beam. During recording, the beam is moved radially across the rotating disc so that the data spots are arranged in a plurality of radially spaced, circular tracks. The radial movement of the beam may be either continuous, in which case the circular tracks form turns of a continuous spiral on the disc surface, or in discrete steps, in which case the tracks are in the form of concentric circles.

In an optical recording produced in this manner, the information is encoded in the sequence of the data spots and intermediate areas by which the data spots are spaced apart in the track direction. In the case of digital data, for example, a data spot may represent a "one" and an intermediate area a "zero" or vice versa. Alternatively, the data to be recorded may be encoded in accordance with one of a number of known schemes in which pulses of different lengths are used to represent specific combinations of data bits. Such signals can then be used to modulate the laser beam so as to form data spots of several different lengths, each length representing a specific combination of data bits. One advantage of such modulating schemes is an increase in the information density of the disc.

The information recorded on the recording medium is read by scanning the tracks with a low intensity laser beam. In the case of a metallic registry layer, for example, the reflectivity of the pits is less than that of the intervening lands. The intensity of the radiation reflected from the disc is, therefore, modulated in accordance with the spatial distribution of the pits and lands along the track enabling the information stored in the pit/land pattern to be recovered upon detection of the reflected radiation. Moreover, the information can be read immediately after it is recorded on the disc. One arrangement for doing this is described in copending U.S. application, S.N. 183,504, filed on Sept. 2, 1980, now abondoned. In the system there disclosed the beam from the laser is split into two portions, one portion forming the write beam and the second portion the read beam. The read and write beams are angularly separated and projected onto the disc so that both beams are aligned in the track direction, with the read beam trailing the write beam by a small distance corresponding to a few bits. The modulated radiation reflected by the disc is then directed onto a photodiode which converts the radiation to an electrical playback signal.

As discussed in an article by K. Bulthuis et al in the August 1979 issue of IEEE Spectrum, pp. 26 to 33, such an arrangment allows the information being recorded to be monitored and drop-outs or errors caused by defects in the surface of the disc to be detected by comparing the data recovered from the disc with the original data. Upon detection of such errors, the data written on a defective sector of the disc is invalidated by recording an appropriate signal in that sector and the data is then rewritten in a new sector.

Although this type of error detection suffices to correct for errors caused by gross defects in the recording medium, it is not adequate to ensure that the data signal is mapped accurately into the spatial pit/land pattern on the disc. For example, in the case of constant angular velocity recording, the linear velocity at the disc periphery is considerably higher than the linear velocity at the disc center. Hence, if the recorded information is to be readout at a constant data rate, the length of a pit representing a given bit or combination of bits will have to be shorter at the central portion of the disc than the length of the corresponding pit at the periphery. The laser power and/or the pulse length of the modulating signal will therefore have to be adjusted in the dependence on the radial distance during recording of the information. Moreover, pit formation in the disc is a thermodynamic process which depends in a complex way on a large number of parameters such as the energy density and distribution in the write spot, the physical properties of the recording layer, exposure time and the like so that the length of the pit formed in the disc is not linearly related to the laser pulse width, i.e. the time that the laser is on. Thus at a given laser power and recording rate, for example, a 50% increase in the laser pulse width will in practice increase the length of the pit by an amount significantly larger than 50%.

These factors become increasingly more important at high data recording rates and data densities which are achieved largely by decreasing the pit size and using various modulation schemes to represent specific bit strings by pits of different lengths. The reason for this is that as the size of the pits decreases and approaches the size of the spot to which the read beam is focused onto the disc, it becomes more difficult to discriminate between pits and the intervening lands, as well as between pits of different lengths. That is, in the case of pits whose length is several times larger than the diameter of the read spot, the signal at the output of the photodiode detector will be a train of well defined rectangular pulses so that it is a relatively easy task to discriminate between pits and lands and/or to discriminate between features of different lengths by detecting the leading edges of successive pulses. However, as the pit and land lengths approach the diameter of the read spot, the pulse width approaches the rise time of the pulses and the signal will have a sinusoidal waveform. Accordingly, the points in the output signal which correspond to leading or trailing edges of a given data spot, such as a land or a pit, become less well defined and their detection involves a greater degree of error. Since the data spot detection error increases, it can be seen that more stringent requirements are imposed on the accuracy with which the input data must be mapped into the data spot pattern in order to maintain the total system errors within acceptable tolerances.

SUMMARY OF THE INVENTION

An object of the invention is to ensure that the optically detectable data pattern formed by a write beam of radiation on a recording medium accurately represents the data to be recorded.

In accordance with the invention, this object is realized by providing an optical recorder of the read-after-write type described above with a closed loop control system comprising a comparator for comparing the original data signal with the data signal recovered from the detected radiation of a second low intensity beam which trails and is modulated by the data pattern formed by the write beam. The comparator generates an error signal indicative of the difference between the original and recovered data signals. The error signal is then applied to a controller which varies the modulation, i.e. the intensity and/or the laser pulse width, of the write beam in dependence on the error signal so as to compensate for distortions introduced in the data pattern by nonuniformities of the recording medium, variations in the laser power, and the like.

The construction of the comparator used in the control system depends on the dominant parameter of the data recording system producing assymetries in the data pattern and/or the particular scheme used for encoding the information to be recorded. Since in the case of digital data most encoding schemes rely on the detection of the edges of the data spots for stable clock recovery and the information is usually contained in the lengths of the data spots, a comparator of general applicability to such recording systems is one that compares the average values, i.e. the pulse duty factors, of the original and recovered data signals. Such a comparator may preferably comprise a differential amplifier which produces at its output a voltage corresponding to the difference in the average value or dc content of the original and recovered data signals applied to its two inputs.

To compensate for the delay between the original and recovered data signals due to the separation between the read and write beams, the original data signal may be applied to the comparator through a delay line so as to match the two signals. However, if the variations to be compensated for are relatively gradual, for example, if the nonuniformities in the registry layer are large in comparison to the micron-sized data spots, the average values of the original and recovered data signals may be taken over a time interval which is large in comparison to the delay between the two signals thereby obviating the need for the matched delay. This may, for example, be effected by applying the output of the differential amplifier to an integrator having a time constant significantly greater than the delay time.

In the case where the write beam is modulated by a modulator, such as an acousto-optic modulator, which is driven by a signal comprised of pulses representing the data to be recorded, the controller may preferably be a pulse shaper which modifies the pulse length and/or pulse height of the input data signal in dependence on the error signal from the comparator. The modulator is then driven by the modified signal, producing corresponding changes in the laser pulse widths and/or beam intensity. The input data signal is thus in effect "predistorted" to compensate for the system assymetries so as to obtain a data pattern on the recording medium which, when read by the read beam, will produce a playback signal substantially identical to the input data signal.

Alternatively, particularly if a solid state diode laser is used to produce the write beam, the modified signal from the controller may be used to control the laser itself thereby eliminating the need for a separate modulator. For example, the voltage pulses of the data signal which are modified by the controller may be converted to corresponding current pulses and used to drive a diode laser so as to obtain the desired beam modulation without the need for an external modulator.

BRIEF DESCRIPTION OF THE DRAWINGS

The invention will now be described in greater detail with reference to the following drawings wherein.

DETAILED DESCRIPTION OF THE PREFERRED EMBODIMENTS

Figure 1:
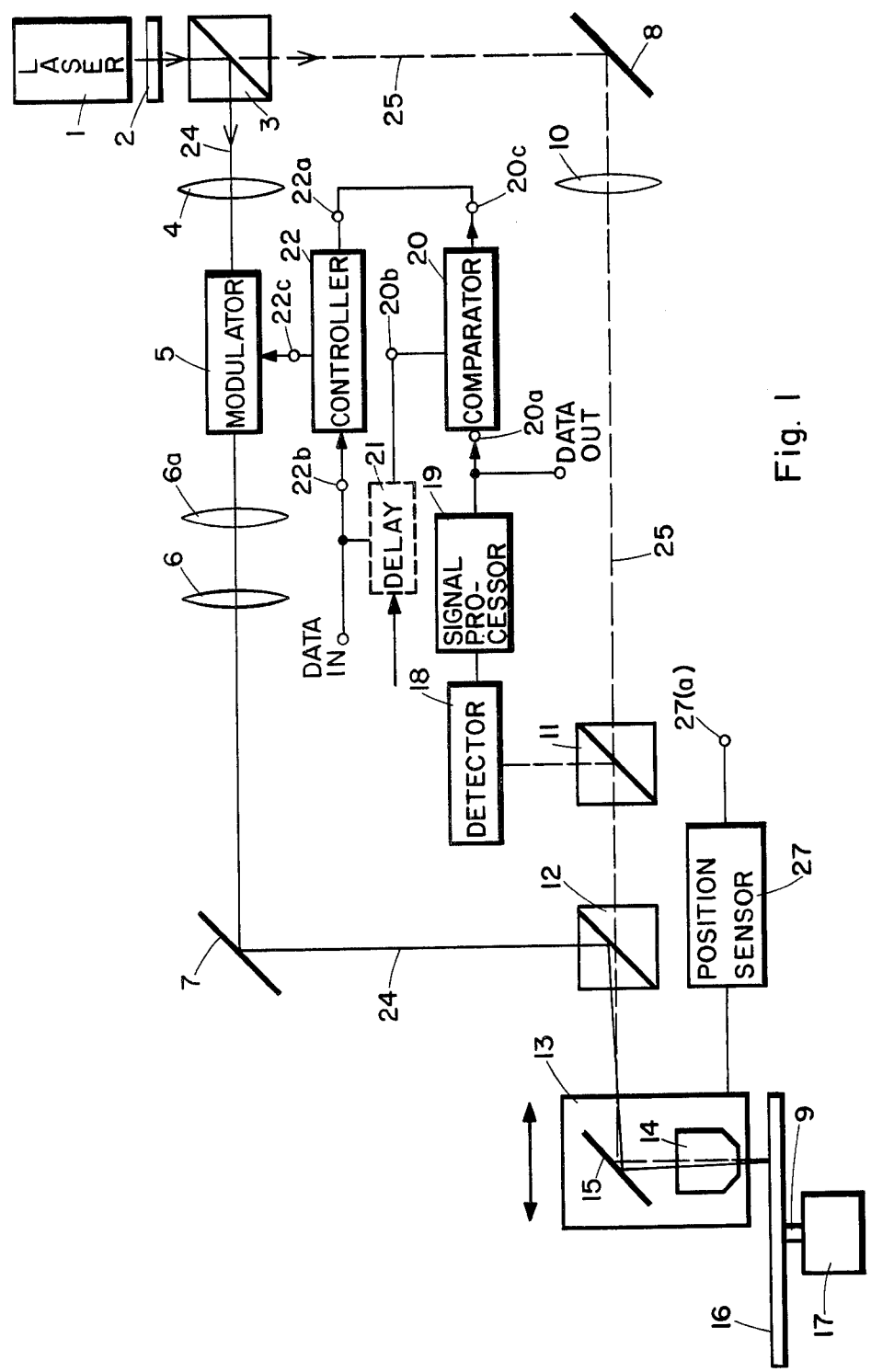
FIG. 1 shows an optical recording apparatus in accordance with the invention.

In accordance with the preferred embodiment shown in FIG. 1, the apparatus uses a laser 1 to produce a plane polarized radiation beam. The laser may, for example, be a HeCd laser emitting about 50 milliwatts at a wavelength of 4416 Å. The laser beam is elliptically polarized by a polarizer such as a half-wave plate 2 and split into two orthogonally polarized beams 24 and 25 by a polarizing beam splitting prism 3. The relative intensities of the two beams depend on the state of polarization of the beam incident on prism 3, which in turn is determined by the angular position of the half-wave plate 2. Typically, the half-wave plate is oriented so that approximately 90% of the incident radiant energy is reflected by prism 3, the refelcted radiation forming the high intensity write beam 24. The remaining 10% of the incident radiant energy passes through the prism 3 to form the low intensity read beam 25.

The write beam 24 is focussed by a lens 4 to a narrow beam waist at the input of an acousto-optic modulator 5. The beam emerging from modulator is collimated by lenses 6 and 6a which, in addition, expand the beam so that it fills the objective 14, to be later described. The lenses 6, 6a and modulator 5 are arranged so that when the modulator is passive, the light exits at an angle with respect to the optical axis so as to miss the aperture of the lens 6a. Upon application of a high frequency electrical signal to the modulator, the light is diffracted along the optical axis and into the aperture of the lens 6a. The collimated beam then passes to mirror 7 which directs it to a polarization sensitive element 12. The intensity of the write beam may thus be modulated by exciting the modulator with a series of high frequency bursts or pulses corresponding to the data to be recorded.

The low intensity read beam 25 passing through beam splitter 3 is deflected by mirror 8 through a spot lens 10 which expands the beam so as to fill the objective lens 14. The read beam then passes through a non-polarization sensitive beam splitter 11, which may be a partially transmissive mirror, and impinges on the polarization sensitive beam splitter 12. Element 12 in effect recombines the two incident beams since it reflects the write beam 24 of one polarization onto mirror 15 while the orthogonally polarized read beam 25 passes through to impinge on mirror 15. The read and write beams are then directed by mirror 15 through an objective 14 which focuses both beams into spots on the disc 16.

Figure 2:
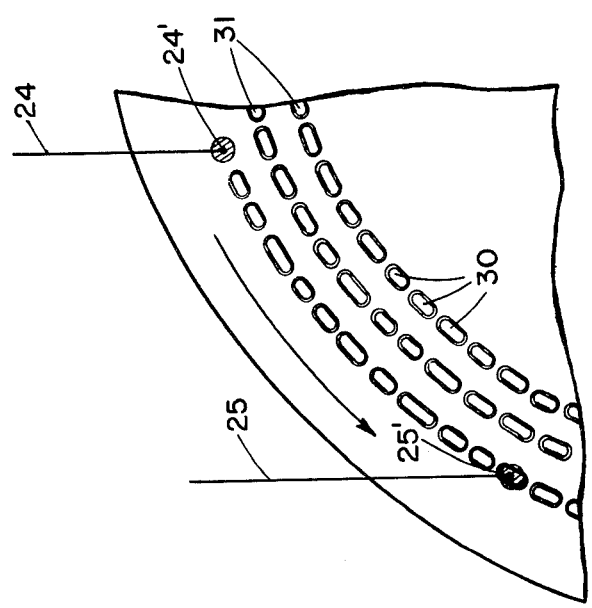
FIG. 2 illustrates a portion of the disc showing the orientation of the read and write beams.

The optical layout of the apparatus is such that the axes of the two beams are inclined by a small angle with respect to each other so as to angularly separate the write beam 24 and the read beam 25 in the track, i.e. tangential, direction by a small distance so that the read spot 25' trails the write spot 24' by a few bits as shown in FIG. 2.

Referring now back to FIG. 1, the disc 16 is supported on a spindle 9 and is rotated by a drive motor 17. The objective 14 and mirror 15 are arranged on a sled 13, which is mounted in known manner for movement radially across the disc 16. In an implemented embodiment of the apparatus, an objective with a numerical aperture of 0.68 was used to focus the two beams produced by the HeCd laser to spots of approximately 0.6 $\mu$m measured at full-width-half-maximum (FWHM). The disc may preferably be of the construction described in U.S. Pat. No. 4,074,282 in which the recording layer is a tellurium alloy film deposited on a clear glass or plastic substrate. A second disc-shaped substrate is hermetically secured in a spaced apart relationship to the first substrate so as to enclose the tellurium alloy film in a dust free atmosphere enabling the recording to be performed without the need for a clean room.

During recording, the intensity of the write beam 24 is modulated by the A/O modulator 5 which is driven by a bi-level data signal, the "zero" level of the signal corresponding to a land and the "one" level corresponding to a pit. As stated previously, the NRZ digital data to be recorded may preferably be encoded in accordance with one of a number of coding schemes such that the data signal used to drive the A/O modulator is comprised of pulses of different lengths, each representing a specific combination of data bits. Because of its low DC content, self-clocking features and modest bandwidth, the Miller modulation scheme has been used to encode the data in the implemented embodiment.

Figure 3:
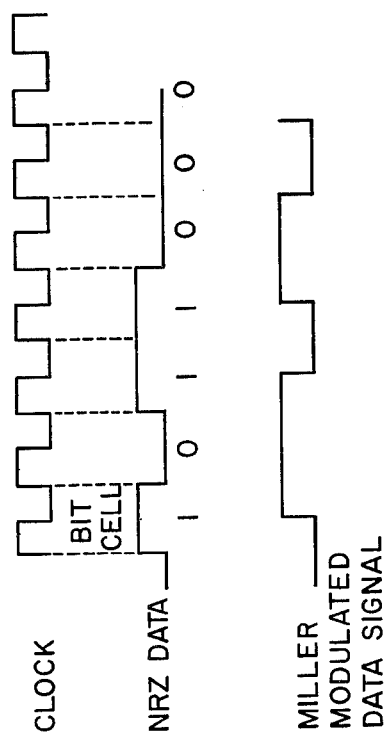
FIG. 3 illustrates one scheme which may be used for encoding the data to be recorded.

As shown in FIG. 3, the NRZ data is converted to Miller format in known manner as follows: NRZ logic "1's" cause a transition in the middle of the bit cells while logic "0's" cause a transition at the beginning of the bit cell. Isolated logic "0's", and the first "0" in a stream of "0's" are ignored. The Miller modulated data signal is then used to drive the A/O modulator so as to produce a corresponding variation in the intensity of the write beam 24.

As the write beam is modulated by the data signal, the disc is rotated by drive motor 17 so that the write spot melts pits 30 in the tellurium film which are arranged in a circular track 31 extending about the center of the disc as shown in FIG. 2. The optical sled 13 is moved radially across the disc at a uniform rate of speed during writing so that the circular tracks are radially spaced from each other and form a continuous spiral on the surface of the disc. Alternatively, the optical sled may be moved radially in discrete steps, one per each revolution of the disc, so that the tracks form a plurality of radially spaced concentric circles. In the case of a 0.6 $\mu$m write spot mentioned earlier, the width of the resultant pits is approximately 0.8 $\mu$m so that a radial spacing of approximately 1.6 $\mu$m between the centers of adjacent tracks is sufficient to reduce cross-talk to acceptable levels during readout of the information.

The read and write beams incident on the disc are reflected back through the objective to the mirror 15 which deflects the radiation to the polarization sensitive beam splitter 12. Because both beams are reflected from the disc in their initial polarization states, the radiation of the write beam is reflected by element 12 towards mirror 7, while the orthogonally polarized read beam passes through and impinges on beam splitter 11 which deflects the radiation onto detector 18. The reflectivity of the pits is substantially lower than that of the intervening lands and, therefore, the intensity of the reflected read beam is modulated in accordance with the pit/land pattern inscribed in the track by the write beam. The modulated radiation incident on the detector, which may be a photodiode or an array of photodiodes, is converted into an electrical signal representative of the modulation of the read beam and, hence, of the spatial pit/land pattern on the disc.

The optical layout of the apparatus as described so far is essentially the same as that disclosed in the aforementioned application Ser. No. 183,504. The construction and operation of the optical portion of the apparatus, and in particular the arrangement for maintaining the beams focused on the recording layer, is more fully described in said application, whose disclosure is incorporated by reference herein.

The signal from the photodetector 18 is fed to a signal processor 19 where it is limited, amplified and processed in known manner to obtain a playback signal which is representative of the pit/land pattern recorded on the disc. Ideally, the playback signal should be the same as the original data signal used to drive the modulator 5. However, because of the factors discussed earlier, such as variations in the sensitivity or thickness of the data layer and the like, the pit/land pattern inscribed on the disc may not in practice accurately represent the input data signal used to drive the A/O modulator so that the playback signal at the output of the signal processor 19 will not be identical to the input data signal. For example, it has been found that if the write beam is modulated with a perfectly square wave, this will not necessarily produce a perfectly symmetrical pit/land pattern on the disc. Accordingly, it is necessary to compare the recovered data with the input data and to modify the modulator drive signal during recording of the information in order to ensure that the input data is mapped accurately into the pit/land pattern on the disc.

In accordance with the invention, this is accomplished by applying the recovered data signal supplied by signal processor 19 to one input 20a of a comparator 20. The input data signal is applied to a second input 20b of the comparator 20, which produces at its output 20c an error signal indicative of the difference between the original and recovered data signals. The error signal is then fed to a controller 22 which in response thereto modifies the input data signal so as to obtain a drive signal for the A/O modulator of an amplitude and waveform required to produce a pit/land pattern which accurately represents the input data signal.

As discussed earlier, the type of compensation provided by the closed loop control system depends on the modulation scheme selected and/or the characteristics of the recording medium. The preferred embodiment, which uses Miller modulation and a tellurium recording layer, employs a control system based on comparison of the average values of the input and recovered data signals of the construction shown in FIG. 4. In the figure, the comparator is represented by dashed-line block 20 and comprises a differential amplifier 42 and integrator 43, formed by operational amplifier 44 and resistor $R_1$ and $C_1$ connected in parallel. The input data and recovered signals are each applied to low pass filters 40 and 41, respectively, which filter out high frequency noise. The outputs of the filters are connected to the two inputs of differential amplifier 42 which provides at its output 42a a signal indicative of the difference in the DC content of the two data signals. The difference signal at the output of amplifier 42 is then fed to the integrator 43. The signal appearing at the output 43a of integrator 43 represents the difference between the DC contents of the input data and recovered data signals averaged over a time period determined by the time constant of the integrator. The output of the integrator 43 is thus a voltage representative of the difference between the pulse duty factor of the input data signal and the spatial duty cycle of the pit/land pattern, i.e. the ratio of the average pit length to the average land length.

The time constant of the integrator may be adjusted by selecting appropriate values for the capacitor $C_1$ and resistor $R_1$ in accordance with the dominant parameter or parameters affecting the asymmetry between the input and recovered data signals. In the case of a metallic registry layer, one such parameter is the variation in its sensitivity due to non-uniformities in the film thickness and/or its composition in different regions of the disc surface. Such non-uniformities are typically macroscopic and the sensitivity of the registry layer is relatively uniform over regions significantly larger than a single pit. Accordingly, the asymmetries introduced by such variations can be compensated for by using an error signal obtained by averaging the difference signal supplied by amplifier 42 over a time period corresponding to the time required to write a substantial number of pits in a segment of a given track. Hence, even though there is a time delay between the data input signal and the recovered signal applied to the difference amplifier 42 due to the fact that the read beam trails the write beam by several bits, this does not affect the operation of the control circuit since the average is taken over a period which is much longer than the delay time between the two signals.

Figure 4:
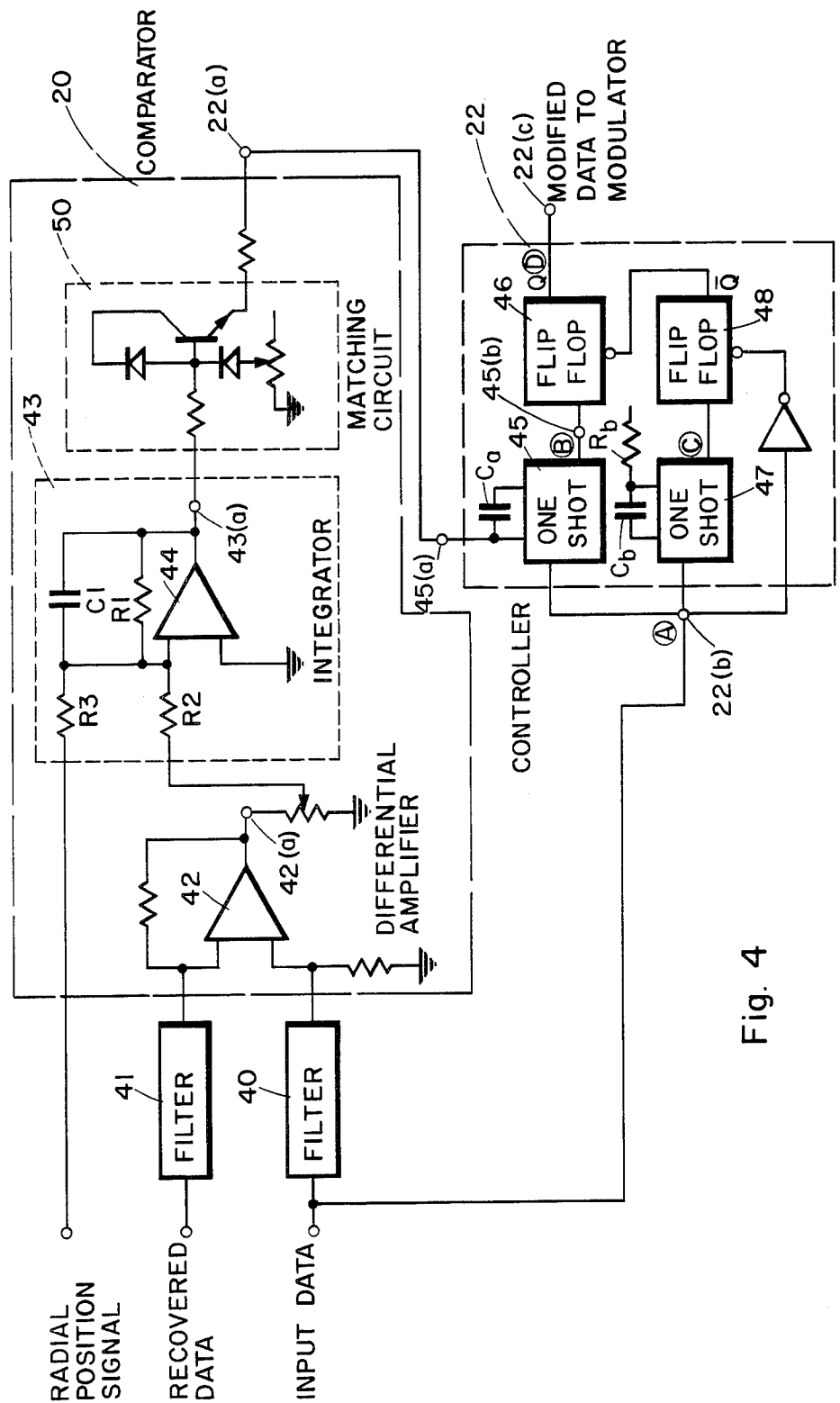
FIG. 4 shows in greater detail one embodiment of the control system of the apparatus of FIG. 1.

The error signal from the integrator 43 is applied, via matching circuit 50, to input 22a of the controller, represented by dashed block 22 in FIG. 4, which modifies the pulse width of the input data signal aplied at its second input 22(b) in dependence on the error signal. The controller is comprised of variable and fixed monostable multivibrators 45 and 47, respectively, and two JK flip-flops 46 and 48, whose interconnections and operation is explained with reference to the waveforms shown in FIG. 5.

Figure 5:
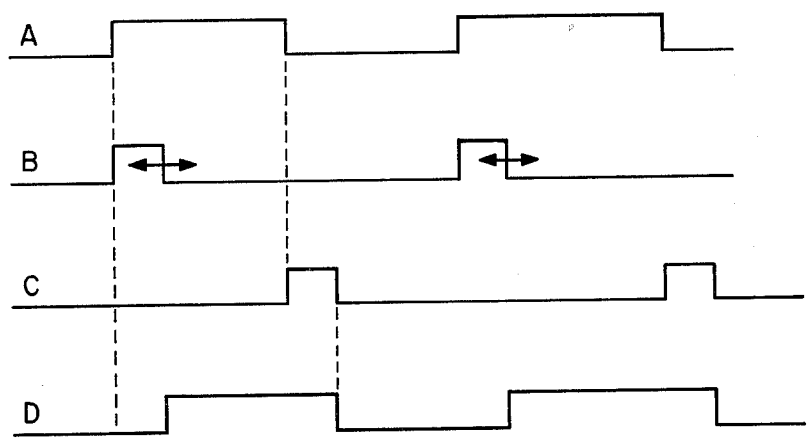
FIG. 5 shows the waveforms of the signals for explanation of the system of FIG. 4.

Multivibrators or "one shots" 45 and 47 are triggered by the input data signal whose waveform is shown at A in FIG. 5. The variable one shot 45 is fired by the leading edge of the input data signal A and returns to its original state after a time period $T_1$ whose duration varies in dependence on the error signal which is applied to terminal 45(a). In the case of a zero error signal, the one shot returns to its original state after a time interval $T_2$ which is determined by the value of capacitor $C_a$ and the input resistance of the matching circuit 50. Thus, the signal at the output 45(b) of one shot 45 has the waveform shown at B in FIG. 5 and comprises a series of pulses whose leading edges coincide with the leading edges of the pulses of the data input signal A and whose width is determined by and varies in dependence on the error signal supplied by the comparator 20, as indicated by the double headed arrows. The matching circuit 50 coupled between the output 43(a) of integrator 43 and terminal 45(a) of one shot 45 is used to interface the analog comparator 20 with the controller 22 so as to insure that the error signal is compatible with the one shot device.

The monostable multivibrator or one shot 47 is triggered by the trailing edges of the pulses of the input data signal A and returns to its stable state after a fixed time period whose duration is determined by capacitor $C_B$ and resistor $R_B$. The value of $C_B$ and $R_B$ are chosen such that the pulse widths of signal C at the output of one shot 47 are equal to time interval $T_2$, which is the same as the pulse widths of signal B at the output of one shot 45 for the case of zero error signal. One shot 47, thus, generates a signal of the waveform shown at C in FIG. 5 which is comprised of a series of pulses of fixed width whose leading egdes coincide with the trailing edges of input data signal A. Signal C generated by one shot 47 is fed to the clock or "toggle" terminal of the J-K flip-flop 48 whose "$\bar{Q}$" output is connected to the "clear" terminal of the second flip-flop 46. Signal B from the variable one shot 45 is aplied to the clock or "toggle" terminal of the flip-flop 46 so that the trailing edge of a pulse in signal B causes the output "Q" of flip-flop 46 to go HIGH. The "Q" output remains HIGH until the flip-flop 46 is reset by the signal from the "$\bar{Q}$" output of flip-flop 48, which is caused to go to the HIGH state by the trailng edge of the pulses of signal C. The signal D at the output of the controller 22 is therefore a train of pulses whose width is determined by the error signal supplied by comparator 20. In the case of zero error signal, except for a time shift, signal D at the output of flip-flop 46 will be identical to the data input signal A since the pulse widths of signals B and C will be the same.

In the case of constant angular velocity disc drive, the linear velocity of the write and read spots relative to the disc will increase with radius from the center to the disc periphery. In order to maintain a constant data rate during read out with constant disc rotational speed, it is therefore necessary to vary the pit length and/or spacing with radius so that the spatial bit frequency decreases from the center to the periphery of the disc. In the embodiment shown in FIG. 4, this is accomplished by adding to the difference signal obtained at the output of the differential amplifier 42 a voltage proportional to the radial position of the write spot on the disc.

Referring back to FIG. 1, the optical sled 13 is provided with a position sensor 27 which generates a voltage proportional to the radial position of the sled. The sensor may, for example, be a linear potentiometer with a wiper shaft which is coupled to and is translated by the sled as it moves radially across the disc. The voltage at the output 27(a) of the position sensor 27, which is proportional to the radial position of the sled 13, is applied to the integrator 43 shown in FIG. 4. This voltage is then added by the adder formed by resistors $R_2$ and $R_3$ to the voltage supplied by the differential amplifier 42, which is proportional to the difference in the DC content of the input and recovered data signals. The error signal at the output of comparator 20, thus, includes a component representative of the radial position of the write spot so that the controller 22 automatically adjusts the pulse widths of the modulator drive signal so as to increase the pit length and/or spacing as the sled and write spot move radially from the central portion towards the outer edge of the disc. The closed loop control system, therefore, performs the dual function of insuring that the spatial bit frequency of the recorded information changes with radius so as to enable readout at a constant data rate and compensating for nonuniformities of the registry layer which would otherwise introduce assymetries in the recovered data signal.

The recording apparatus of FIG. 1 has been described with reference to a disc with a metallic registry layer. The control system of the invention may, however, be used with any recording system in which the write beam produces an optically detectable change in one or more properties of a recording medium so as to enable the information to be read immediately after it is recorded. The data registry layer may, for example, be an organic compound or a dye whose reflectivity, transmissivity or other optical property changes upon exposure to the write beam. Moreover, the recorded data may be read out in the transmission mode by positioning the detector on the side of the disc which is remote from the laser and sensing variations in the beam passing through the disc. The parameter or parameters producing assymmetries in the recorded data will, accordingly, depend on the material selected for the data registry medium. In some applications, therefore, it may be desirable to compare the input and recovered data directly rather than comparing their average values taken over a time period considerably longer than the bit, i.e. pulse, duration. In that event, the delay between the input data and the recovered data due to the fact that the read spot trails the write spot by a few bits, may be compensated for by the addition of a matched delay 21 in the data path before comparison of the two signals, as shown in FIG. 1. The matched delay 21 delays the input data signal by a time period corresponding to the distance by which the read spot trails the write spot so that the two data signals can be compared directly and the error signal generated by comparator 20 is then used for real time correction of the modulator drive signal.

As discussed earlier, in the case of constant angular velocity recording, the pits representing a given data bit will be shorter at the central portion of the disc than the corresponding pit at the disc periphery. Accordingly, for a constant spacing between the read and write spots, the two spots will be "separated" by a larger number of data bits at the central portion of the disc than at the disc periphery. To compensate for this variation of the spatial bit frequency, the delay 21 is variable and controlled by the signal generated by the position sensor 27 so that the input data is delayed by a time period which is a function of the radial position of the sled and matches the recovered data signal.

For the case of constant linear recording wherein the rotational speed is varied in dependence on the radial position of the read spot on the disc, the delay 21 is constant and the position sensor may be omitted.

In the embodiment of FIG. 4, the controller 22 modifies the pulse widths of the modulator drive signal so as to vary the lengths and/or the spacing between successive data spots so as to ensure that the data pattern is an accurate representation of the data to be recorded. The same result can also be achieved by varying the intensity of the write beam in dependence on the error signal supplied by the comparator 20. This is so because at a given data recording rate, the size of the data spot depends on the energy delivered by the write beam to the recording medium. Hence, the length of the data spots may also be varied by increasing or decreasing the write beam intensity rather than varying the laser pulse width. Accordingly, the controller 22 of FIG. 1 may be constructed in known manner to modify the pulse heights of the original data signal in dependence on the error signal. Alternatively, the controller may be used to modify both the pulse width and the pulse height of the original data signal, particularly when it is desired to vary the write beam intensity during recording, for example, to compensate for changes in the linear recording velocity when recording on a disc rotating at a constant angular speed. The modified data signal is then used to drive the A/O modulator so as to produce a corresponding change in the intensity and pulse lengths of the laser beam.

As stated previously, there are a number of known modulation schemes which can be used to encode the data in lieu of the Miller modulation scheme used in the implemented embodiment. Some of these schemes have characteristic power spectrums, such as, for example, ones in which the power level is substantially zero at a specific frequency or frequencies or ones in which the fundamental to second harmonic ratio has a specific value. Accordingly, a comparator which compares the first and second harmonic ratios or the levels at specific frequencies within the frequency spectrums of the input data and recovered data signals may be used in the control system in place of the average signal level comparator described in reference with FIG. 4. Such comparators may, for example, include spectrum analyzers which provides output voltages proportional to the levels of specific frequencies, such as the fundamental and first harmonic. The output voltages may then be applied to dividers to obtain the ratios of those frequencies in the input and recovered data signals and the ratios compared to obtain the error signal used to control the modulation of the write beam. Alternatively, the levels at specific frequencies of the original and recovered data signals may be compared directly to produce the error signal.

Figure 6:
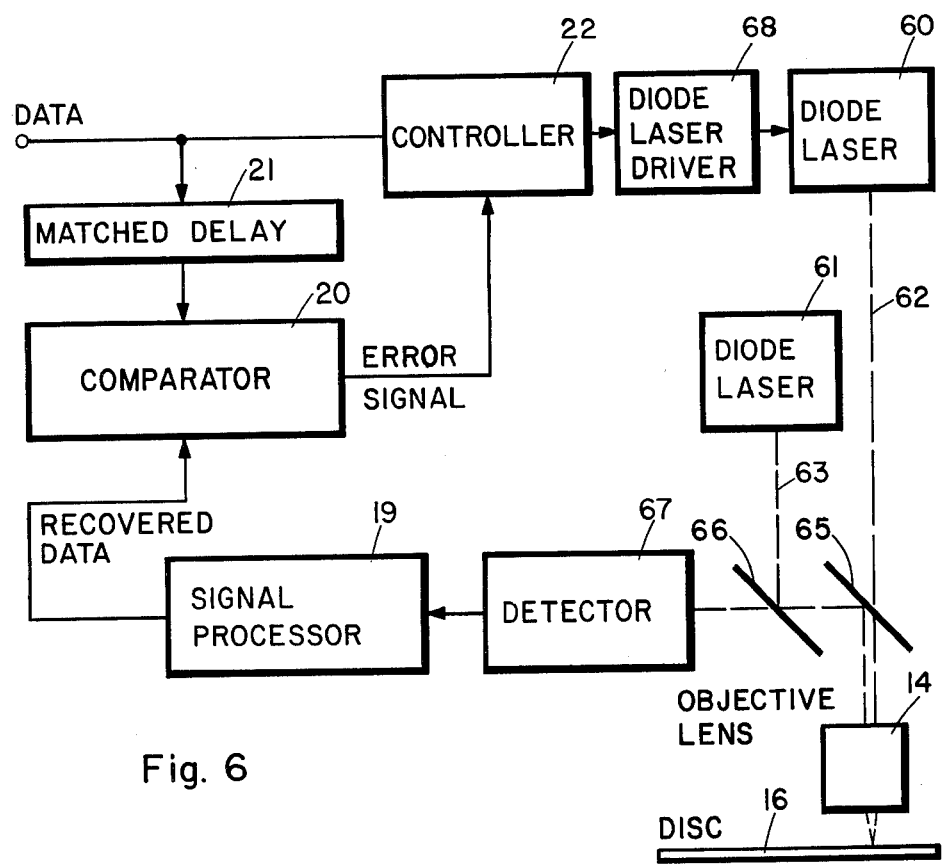
FIG. 6 shows another embodiment of the recording apparatus in accordance with the invention.

Particularly if a solid state diode laser is used to generate the write beam, the modified data signal may be used to modulate the laser itself thereby obviating the need for a separate modulator. Such an arrangement is illustrated in FIG. 6. As shown in the figure, in this arrangement two diode lasers 60 and 61 are used to produce the write and read beams 62 and 63, respectively. The write beam 62 passes through a semireflective mirror 65 and is focussed onto the disc 16 by the objective 14. The read beam 63 is deflected by a second semireflective mirror 66 onto the mirror 65 which reflects it through the objective lens 14. As in the embodiment of FIG. 1, the optical axes of the two beams 62 and 63 are inclinded with respect to each other so that the read spot is tangentially aligned with and trails the write spot by a small distance.

The recording and readout of data is carried out in essentially the same manner as described above with reference to FIG. 1, except that the write beam is modulated by the diode laser driver 68 rather than by a separate modulator disposed in the path of the beam. Thus, the modulated read beam reflected by the disc is detected by the detector 67 and the resultant signal is applied to the signal processor 19 which supplies the recovered data signal to the comparator 20. As in the control system of FIG. 1, the comparator 20 produces an error signal indicative of the difference between the input and recovered data signals and the controller 22 modifies the pulse widths and/or pulse heights of the input data signal in dependence on the error signal. Rather then driving an A/0 modulator, the modified data signal in the embodiment of FIG. 6 is fed to the diode laser driver where it is converted to corresponding current pulses which are then used to excite the diode laser 60.

Because it does not require a separate modulator, polarizers and polarizing beam splitters, the optical system of the apparatus shown in FIG. 6 is much simplier and more compact than that of FIG. 1. Moreover, the small size of the diode lasers makes it possible to mount the entire optical system on the sled, further reducing the size of the recording apparatus.

The recording apparatus of FIG. 6 may be further simplified by using the read diode laser 61 itself rather than a separate photodetector to detect the modulated radiation reflected from the disc. This may be done by using the mirror 66 to direct the modulated read beam reflected from the disc back to the diode laser 61. Because the resistance of the diode laser varies in accordance with the intensity of the reflected radiation, the information recorded on the disc may be detected by sensing the changes in the diode laser resistance in the manner described in copending U.S. application S.N. 130,906, filed Mar. 17, 1980, now U.S. Pat. No. 4,365,323.

We claim:

1. An apparatus for recording data in a form detectable by a read beam of radiation on a recording medium which comprises a radiation sensitive material, said apparatus comprising means for directing a write beam of radiation onto the recording medium, means for producing relative movement between said write beam and said recording medium, means for modulating said write beam in accordance with the data to be recorded so that said write beam records the data on the recording medium by forming thereon a pattern of spaced apart data spots arranged in an elongated track such that when said track is scanned by the read beam, the read beam is modulated by said pattern in accordance with the data stored thereby, means for directing a second beam of radiation onto said track so that said second beam is spaced from and trails said write beam and is modulated by said pattern formed by said write beam, means for deriving from the modulated radiation of said second beam a first signal representative of the data stored by said pattern, means for comparing said first signal with a second signal representative of the data to be recorded, said comparing means generating an error signal representative of the difference between said first and second signals, and means responsive to said error signal for modifying said second signal in dependence on said error signal, said modulating means being responsive to and modulating said write beam in dependence on said modified second signal so as to ensure that said pattern represents the data to be recorded.

2. The apparatus according to claim 1 wherein said recording medium is a disc provided with a layer of said radiation sensitive material and said movement producing means includes means for rotating said disc and means for moving said write beam radially with respect to said disc so that said write beam forms, on said disc, a plurality of said tracks which are circular and are radially spaced from each other to define a spiral or a plurality of concentric circles, said apparatus further including means for sensing the radial position of said write beam on said disc, said sensing means generating a third signal indicative of said radial position, and means for combining said third and error signals, said controlling means being responsive to said combined third and error signals so that said modulation of said write beam is varied thereby in dependence on said radial position of said write beam and said error signal generated by said comparing means.

3. The apparatus according to claims 1 or 2 wherein said comparing means compares the average values of said first and second signals taken over a predetermined time interval and said error signal represents the difference between said average values.

4. The apparatus according to claim 3 wherein said predetermined time interval is greater than the time delay between said first and second signals due to the spatial separation of the write and second beams on said recording medium.

5. The apparatus according to claim 1 wherein said first and second signals each comprises a series of pulses and said modifying means varies the width of said pulses of said second signal in dependence on said error signal and wherein said modulation means in response to said modified second signal changes the modulation of said write beam so as to produce a corresponding change in the length of said data spots in the track direction.

6. The apparatus according to claim 5 wherein said modulating means includes an acousto-optic modulator disposed in the path of said write beam and driven by said modified second signal.

7. The apparatus according to claims 1 or 2 including means for delaying said second signal by a time interval corresponding to the time delay between said first and second signals due to the spatial separation of said write and second beams on said recording medium prior to comparison of said first and second signals by said comparing means.

8. The apparatus according to claims 1 or 2 including means for generating a beam of radiation, means for dividing said beam generated by said generating means into two beams each defining a respective one of said write and second beams, and an objective, said directing means being arranged to direct said write and second beams through said objective which focuses said beams onto said recording medium.

9. The apparatus according to claims 1 or 2 including a first diode laser for generating said write beam and a second diode laser for generating said second beam.

10. The apparatus according to claims 1 or 2 wherein said radiation sensitive material is reflective and said data spots are pits formed in said material, said pits having a lower reflectivity than areas disposed between said pits.

11. An apparatus for recording data in a form detectable by a read beam of radiation on a disc provided with a radiation sensitive layer, said apparatus comprising means for rotating the disc, means for directing a write beam of radiation onto the disc, means for modulating said write beam in response to a drive signal representing the data to be recorded, means for moving said write beam radially with respect to the disc so that said write beam forms, on the disc, a plurality of spaced apart data spots arranged in radially spaced circular tracks and defining a pattern representing the data which, when scanned by the read beam, modulates the read beam in accordance with the data stored thereby, means for directing a second beam of radiation onto said pattern so that said second beam is spaced from and trails said write beam and is modulated by said pattern formed by said write beam, means for deriving from the modulated radiation of said second beam a playback signal which represents the data stored by said pattern, means for comparing said playback signal with a data signal representing the data to be recorded, said comparing means generating an error signal representative of the difference between said playback and data signals and means for modifying said data signal in dependence on said error signal, said modified data signal defining said drive signal which is applied to said modulating means so that the modulation of said read beam is varied thereby in dependence on said error signal.

12. The apparatus according to claim 11 wherein said playback and data signals each comprises a series of pulses and said modifying means includes means for varying the width of said pulses of said data signal in dependence on said error signal.

13. The apparatus according to claims 11 or 12 wherein said comparing means compares the average values of said playback and data signals taken over a predetermined time interval and said error signal is representative of the difference between said average values.

14. The apparatus according to claim 13 wherein said comparing means includes a differential amplifier having an output and a pair of inputs, means for applying each of said playback and data signals to a respective one of said inputs, and an integrator coupled to said output of said differential amplifier.

15. The apparatus according to claims 11 or 12 including means for sensing the radial position of said write beam on said disc, said sensing means generating a position signal indicative of said radial position, and wherein said modifying means is responsive to said position signal and modifies said data signal in dependence on said position and error signals so that said modulation of said write beam is varied in dependence on the radial position of said write beam and said error signal generated by said comparing means.

16. The apparatus according to claim 15 including means for combining said position and error signals to produce a further signal representative of said difference between said playback and data signals and said radial position and means for applying said further signal to said modifying means.

* * * * *